(12) United States Patent
Hockemeyer et al.

(10) Patent No.: US 11,383,494 B2
(45) Date of Patent: Jul. 12, 2022

(54) CERAMIC MATRIX COMPOSITE ARTICLES HAVING DIFFERENT LOCALIZED PROPERTIES AND METHODS FOR FORMING SAME

(71) Applicant: GENERAL ELECTRIC COMPANY, Schenectady, NY (US)

(72) Inventors: Matthew Hockemeyer, Saratoga Springs, NY (US); Jason David Shapiro, Methuen, MA (US); K.M.K. Genghis Khan, Niskayuna, NY (US); James Scott Vartuli, Rexford, NY (US); Daniel Gene Dunn, Guilderland, NY (US); Shatil Sinha, Clifton Park, NY (US); Douglas Decesare, Queensbury, NY (US); Suresh Subramanian, Mason, OH (US)

(73) Assignee: General Electric Company, Schenectady, NY (US)

( * ) Notice: Subject to any disclaimer, the term of this patent is extended or adjusted under 35 U.S.C. 154(b) by 231 days.

(21) Appl. No.: 15/200,881

(22) Filed: Jul. 1, 2016

(65) Prior Publication Data

US 2018/0002238 A1   Jan. 4, 2018

(51) Int. Cl.
*B32B 18/00* (2006.01)
*C04B 37/00* (2006.01)
(Continued)

(52) U.S. Cl.
CPC .............. *B32B 18/00* (2013.01); *B28B 1/522* (2013.01); *B28B 11/08* (2013.01); *C04B 35/565* (2013.01);
(Continued)

(58) Field of Classification Search
CPC ................ C04B 35/806; C04B 35/565; C04B 2235/5244; C04B 2235/3826; F01D 5/005;
(Continued)

(56) References Cited

U.S. PATENT DOCUMENTS 3,849,181 A * 11/1974 Green ............... C04B 35/62245
428/390
5,153,152 A   10/1992 Dawes et al.
(Continued)

FOREIGN PATENT DOCUMENTS

CN    1102632 A   5/1995
CN    1749216 A   3/2006
(Continued)

OTHER PUBLICATIONS

English Machine translation of FR 2864829 from epsacenet.com, tranlsated Jul. 11, 2018.*
(Continued)

*Primary Examiner* — Jennifer A Gillett
(74) *Attorney, Agent, or Firm* — Dority & Manning, P.A.

(57) ABSTRACT

Ceramic matrix composite articles include, for example a first plurality of plies of ceramic fibers in a ceramic matrix defining a first extent, and a local at least one second ply in said ceramic matrix defining a second extent on and/or in said first plurality of plies with the second extent being less than said first extent. The first plurality of plies has a first property, the at least one second ply has at least one second property, and said first property being different from said at least one second property. The different properties may include one or more different mechanical (stress/strain) properties, one or more different thermal conductivity prop- (Continued)

erties, one or more different electrical conductivity properties, one or more different other properties, and combinations thereof.

17 Claims, 5 Drawing Sheets (51) Int. Cl.
| | |
|---|---|
| C04B 35/80 | (2006.01) |
| C04B 35/571 | (2006.01) |
| C04B 35/565 | (2006.01) |
| C04B 35/626 | (2006.01) |
| C04B 35/628 | (2006.01) |
| F01D 5/00 | (2006.01) |
| F01D 5/28 | (2006.01) |
| F01D 9/02 | (2006.01) |
| F23R 3/00 | (2006.01) |
| B28B 1/52 | (2006.01) |
| B28B 11/08 | (2006.01) |

(52) U.S. Cl.
CPC ........ *C04B 35/571* (2013.01); *C04B 35/6267* (2013.01); *C04B 35/62884* (2013.01); *C04B 35/80* (2013.01); *C04B 37/001* (2013.01); *F01D 5/005* (2013.01); *F01D 5/282* (2013.01); *F01D 9/02* (2013.01); *F23R 3/007* (2013.01); *B32B 2262/105* (2013.01); *C04B 2235/3826* (2013.01); *C04B 2235/5244* (2013.01); *C04B 2235/614* (2013.01); *C04B 2235/9607* (2013.01); *C04B 2237/38* (2013.01); *C04B 2237/584* (2013.01); *F05D 2220/32* (2013.01); *F05D 2230/31* (2013.01); *F05D 2300/6033* (2013.01)

(58) Field of Classification Search
CPC ........ F01D 5/282; F01D 9/02; F05D 2220/32; F05D 2300/6033; F05D 2230/31; F23R 3/007; B32B 2262/105; B32B 18/00; B32B 5/14; B32B 5/26; B32B 2315/02; F23F 3/007
USPC ... 428/131, 134, 138, 210, 293.4, 58, 77, 78
See application file for complete search history.

(56) References Cited

U.S. PATENT DOCUMENTS

| | | | | |
|---|---|---|---|---|
| 5,190,820 | A * | 3/1993 | Millard | C04B 35/62855 428/378 |
| 5,376,598 | A * | 12/1994 | Preedy | B32B 18/00 156/89.22 |
| 5,378,110 | A * | 1/1995 | Ress, Jr. | F01D 5/02 416/229 R |
| 5,759,699 | A * | 6/1998 | French | C04B 35/80 428/447 |
| 5,928,448 | A * | 7/1999 | Daws | B23P 6/00 156/92 |
| 6,217,997 | B1 * | 4/2001 | Suyama | C04B 35/565 428/293.4 |
| 6,228,453 | B1 * | 5/2001 | Fareed | B32B 18/00 428/403 |
| 6,670,021 | B2 * | 12/2003 | Schroder | F16C 33/043 138/145 |
| 8,114,799 | B2 | 2/2012 | Subramanian et al. | |
| 8,333,340 | B2 | 12/2012 | Roberts, III et al. | |
| 9,102,571 | B2 | 8/2015 | Szweda et al. | |
| 9,308,708 | B2 | 4/2016 | Kleinow | |
| 9,545,774 | B1 * | 1/2017 | Heng | B32B 7/08 |
| 2003/0196305 | A1 * | 10/2003 | Kebbede | B23P 6/005 29/402.11 |
| 2004/0115395 | A1 * | 6/2004 | Cairo | B32B 18/00 428/131 |
| 2005/0158171 | A1 * | 7/2005 | Carper | B32B 18/00 415/200 |
| 2006/0121265 | A1 * | 6/2006 | Thompson | F01D 5/147 428/293.4 |
| 2006/0141257 | A1 | 6/2006 | Subramanian et al. | |
| 2009/0324878 | A1 * | 12/2009 | Steibel | C04B 35/573 428/113 |
| 2010/0074729 | A1 * | 3/2010 | Merrill | B32B 18/00 415/139 |
| 2010/0279072 | A1 * | 11/2010 | Morrison | B28B 19/00 428/172 |
| 2015/0140256 | A1 | 5/2015 | Valle | |
| 2016/0136925 | A1 | 5/2016 | Chamberlain et al. | |

FOREIGN PATENT DOCUMENTS

| | | | | |
|---|---|---|---|---|
| CN | 103113123 | A | 5/2013 | |
| CN | 103203523 | A | 7/2013 | |
| CN | 104507676 | A | 4/2015 | |
| CN | 105473821 | A | 4/2016 | |
| FR | 2864829 | A1 * | 7/2005 | ............ B32B 18/00 |
| GB | 2 239 214 | A | 6/1991 | |
| JP | H05208873 | A | 8/1993 | |
| JP | 2005/201244 | A | 7/2005 | |
| JP | 2006/143570 | A | 6/2006 | |
| JP | 2008/151117 | A | 7/2008 | |
| JP | 2015/523948 | A | 8/2015 | |
| WO | WO96/08873 | A1 | 3/1996 | |
| WO | 2013/171770 | A1 | 11/2013 | |
| WO | 2014143649 | A1 | 9/2014 | |
| WO | 2014151066 | A1 | 9/2014 | |
| WO | WO-2014159557 | A1 * | 10/2014 | ............ D06M 11/74 |

OTHER PUBLICATIONS

Intersperse, Definiton of Intersperse by Merriam-Webster, www.merriam-webster.com/dictionary/intersperse, retrieved Mar. 18, 2019.*
Viswanathan et al; "Engineered Multilayer Multimaterial Thermal Barrier Coatings for Enhanced Durability and Functionality," The American Ceramic Society 39th International Conference & Exposition on Advanced Ceramics and Composites Abstract Book, p. 49, Jan. 25-30, 2015.
Daniel G. Dunn; "The Effect of Fiber Volume Fraction in Hipercomp SiC-SiC Composites," Thesis submitted to the faculty of Alfred University in Partial Fulfillment of the Requirements for the Degree of Philosophy in Ceramics, Alfred, New York, 95-pages, Sep. 2010.
International Search Report and Written Opinion issued in connection with corresponding PCT Application No. PCT/US2017/37590 dated Oct. 11, 2017.
Machine Translated Japanese Search Report Corresponding to Application No. 2018567581 dated Feb. 17, 2021.
Machine Translated Japanese Office Action Corresponding to Application No. 2018567581 dated Feb. 22, 2021.
Chinese Office Action and Search Report Corresponding to Application No. 201780041061 dated Feb. 22, 2021.

* cited by examiner

CERAMIC MATRIX COMPOSITE ARTICLES HAVING DIFFERENT LOCALIZED PROPERTIES AND METHODS FOR FORMING SAME

GOVERNMENT RIGHTS

The disclosure was made with Government support under United States Air Force, contract number FA8650-04-G-2466-003. The Government has certain rights in the disclosure.

TECHNICAL FIELD

The present disclosure generally relates to ceramic matrix composites (CMC), and more particularly, to CMC articles having different localized properties and methods for forming same.

BACKGROUND

Ceramic matrix composites generally include a ceramic fiber reinforcement material embedded in a ceramic matrix material. The reinforcement material serves as the load-bearing constituent of the ceramic matrix composites in the event of a matrix crack, while the ceramic matrix protects the reinforcement material, maintains the orientation of its fibers, and serves to dissipate loads to the reinforcement material. Of particular interest to high-temperature applications, such as in gas turbines, are silicon-based composites, which include silicon carbide (SiC) as the matrix and/or reinforcement material. Typically, ceramic matrix composites are formed from plies of reinforcement material having varying orientations, which allow for some tailoring of the part properties.

SUMMARY

Shortcomings of the prior art are overcome and additional advantages are provided through the provision, in one embodiment, of a method for use in forming a ceramic matrix composite article. The method includes, for example, laying up a first plurality of plies having ceramic fibers defining a first extent, laying up at least one second ply defining a second extent on the layup of the first plurality of plies, the second extent being less than the first extent, and wherein the first plurality of plies has a first property, the at least one second ply has at least one second property, and the first property being different from the at least one second property.

In another embodiment, a ceramic matrix composite article includes, for example, a first plurality of plies of ceramic fibers in a ceramic matrix defining a first extent, at least one second ply in the ceramic matrix defining a second extent on and/or in the first plurality of plies, the second extent being less than the first extent, and wherein the first plurality of plies has a first property, the at least one second ply has at least one second property, and the first property being different from the at least one second property.

DRAWINGS

The foregoing and other features and advantages of this disclosure will become apparent from the following detailed description of the various embodiments of the disclosure taken in conjunction with the accompanying drawings, wherein.

DETAILED DESCRIPTION

Embodiments of the present disclosure and certain features, advantages, and details thereof, are explained more fully below with reference to the non-limiting examples illustrated in the accompanying drawings. Descriptions of well-known materials, processing techniques, etc., are omitted so as not to unnecessarily obscure the disclosure in detail. It should be understood, however, that the detailed description and the specific examples, while indicating embodiments of the present disclosure, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure is generally directed to ceramic matrix composite (CMC) articles having, for example, different localized properties. Application of materials with different properties may allow tailoring the CMC article to have one or more localized portions, areas, or regions in the CMC article with different properties. For example, different portions, areas, or regions of the CMC article may have different properties such as one or more different mechanical (stress/strain) properties, one or more different thermal conductivity properties, one or more different electrical conductivity properties, or other different properties, and combinations thereof.

As described in greater detail below, the different localized properties in the CMC article may be tailored by employing a layup of local plies having one or more different properties compared to a layup of other plies for forming the CMC article. For example, a CMC article according to the present disclosure may be formed from a layup of a first plurality of plies having ceramic fibers defining a first extent, and a local layup of at least one second ply defining a second extent on and/or in the layup of the first plurality of plies wherein the second extent is less than the first extent. By employing the first plurality of plies having a first property, and the at least one second ply having at least one second property different from the first property, localized portions of the CMC article may have one or more different properties. In some embodiments, a CMC article may be formed from the at least one second ply having ceramic fibers or the at least one second ply being unreinforced, e.g., without fibers. In some embodiments, a CMC article may be formed from first and second plies where the ceramic matrix is the same or where the ceramic matrix is different in the first and second plies, and where the first and second plies may include the same or different fibers or where the second plies include no fibers. In some embodiments, a CMC article may be formed from plies of ceramic fibers such as prepreg plies having a precursor matrix and ceramic fibers. In some embodiments, the type of fibers or amount of fibers in the plies may be different. In some embodiments, the different plies may include a single different ply or a plurality of interspersed different plies. In some embodiments, the different ply or plies may be localized and act as reinforcement in the CMC article for apertures or holes. The present disclosure may increase the life of CMC articles or parts by preventing and/or inhibiting crack growth.

Figure 1:
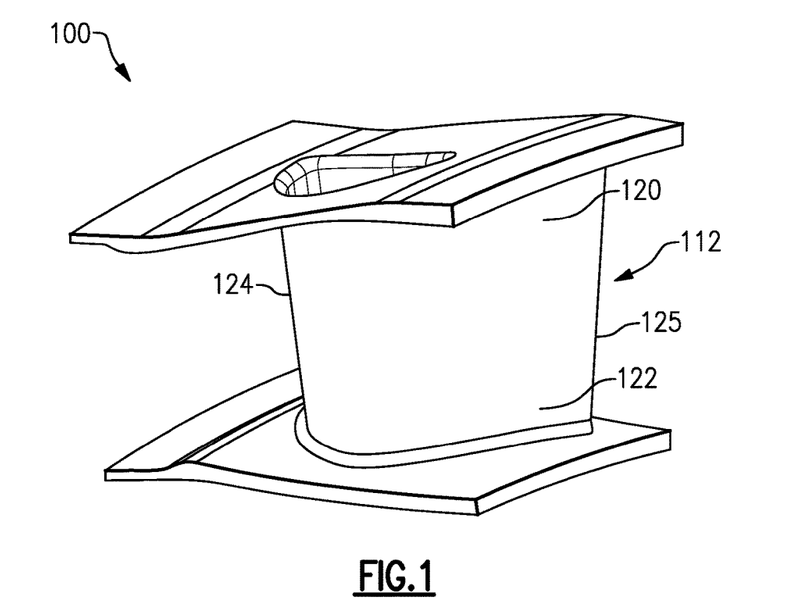
FIG. 1 is a perspective view of a ceramic matrix composite (CMC) article according to an embodiment of the present disclosure.

FIG. 1 illustrates a CMC article 100 according to an embodiment of the present disclosure. In this illustrated embodiment, CMC article 100 may be a turbine vane or turbine blade. Exemplary ceramic matrix composite turbine blade or vane 100 may include an airfoil section 112 defining a root section 120, a tip section 122, a leading edge 124, and a trailing edge 125. For example, localized properties may be disposed along the leading edge, along the trailing edge, the root section, and or the tip section. The ceramic matrix composite turbine blade or vane 100 may include cooling holes (not shown in FIG. 1), and the localized properties may be disposed along the cooling holes.

Ceramic matrix composite gas turbine blade or vane 100 may be generally fabricated from a plurality of plies of ceramic fibers such as prepreg plies disposed in a layup that is cured/pyrolyzed and densified as described in greater detail below. In addition, portions of the ceramic matrix composite turbine blade or vane 100 may incorporate features of the ceramic matrix composite articles described below.

Figure 2:
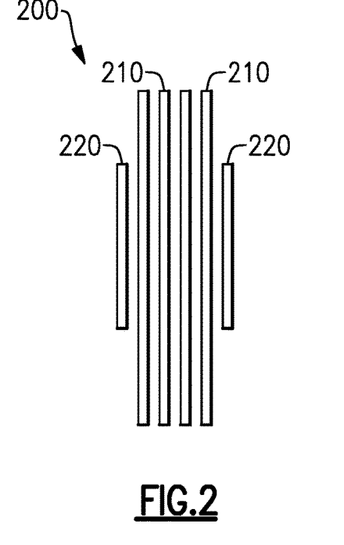
FIG. 2 is a cross-sectional view of a CMC article according to an embodiment of the present disclosure.

FIG. 2 illustrates a cross-section of a portion of a CMC article 200 having different localized properties on the surface of CMC article 200 according to an embodiment of the present disclosure. For example, in one embodiment, CMC article 200 may have a first plurality of plies 210 of ceramic fibers in a ceramic matrix defining a first extent, and a local at least one second ply such as a pair of plies 220 defining a second extent on first plurality of plies 210. The local second plies may include ceramic fibers in a ceramic matrix or not contain ceramic fibers. The ceramic matrix of the first plies may be the same or different than one or more ceramic matrices of the second plies. In some embodiments, non-fiber containing second plies may be fugitive. The second extent such as an area being less than the first extent such as an area. For example, the first plurality of plies may have a first extent having a first area defined by a first peripherally-extending edge, the local second plies may have a second extent having a second area defined by a second peripherally-extending edge, and the first area and the first peripherally-extending edge may be sized larger than the second area and the second peripherally-extending edge. The entire extent of the local second plies may be disposed on or in the first extent of the first plurality of plies.

The first plurality of plies may include a first property, the pair of second plies may include a second property, and the first property is different from the second property. In other embodiments, the pair of second plies may include one or more different second properties, which are different from the first property. The different properties are described below.

Figure 3:
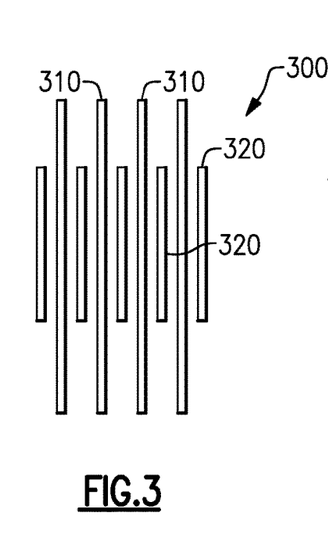
FIG. 3 is a cross-sectional view of a CMC article according to an embodiment of the present disclosure.

FIG. 3 illustrates a cross-section of a portion of a CMC article 300 having different localized properties in CMC 300 according to an embodiment of the present disclosure. For example, in one embodiment, CMC article 300 may have a first plurality of plies 310 of ceramic fibers in a ceramic matrix defining a first extent, and a local plurality of second plies 320 defining a second extent in first plurality of plies 310. The local second plies may include ceramic fibers in a ceramic matrix or not contain ceramic fibers. The ceramic matrix of the first plies may be the same or different than one or more ceramic matrices of the second plies. In some embodiments, non-fiber containing second plies may be fugitive. The second extent such as an area being less than the first extent such as an area. For example, the first plurality of plies may have a first extent having a first area defined by a first peripherally-extending edge, the local second plies may have a second extent having a second area defined by a second peripherally-extending edge, and the first area and the first peripherally-extending edge may be sized larger than the second area and the second peripherally-extending edge. The entire extent of the local second plies may be disposed on or in the first extent of the first plurality of plies. The first plurality of plies may include a first property, the at least one second ply includes one or more second properties, and the first property is different from the one or more second properties. The different properties are described below.

Figure 4:
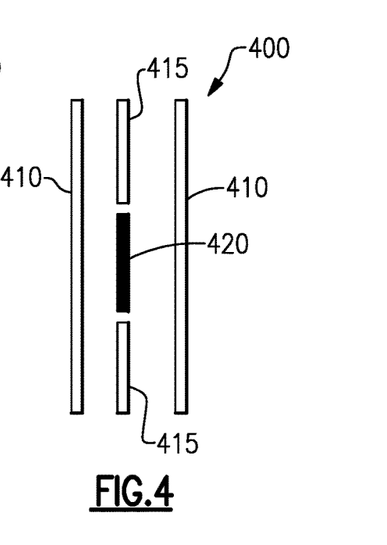
FIG. 4 is a cross-sectional view of a CMC article according to an embodiment of the present disclosure.

FIG. 4 illustrates a cross-section of a portion of a CMC article 400 having different localized properties on the surface of CMC article 400 according to an embodiment of the present disclosure. For example, in one embodiment, CMC article 400 may have a first plurality of plies 410 and 415 of ceramic fibers in a ceramic matrix defining a first extent, and a local at least one second ply 420 defining a second extent disposed within first plurality of plies 410 and 415. The local at least one second ply may include ceramic fibers in a ceramic matrix or not contain ceramic fibers. The ceramic matrix of the first plies may be the same or different than the ceramic matrix of the one or more second ply. In some embodiments, a non-fiber containing second ply may be fugitive. The second extent such as an area being less than the first extent such as an area. For example, the first plurality of plies may have a first extent having a first area defined by a first peripherally-extending edge, the local second plies may have a second extent having a second area defined by a second peripherally-extending edge, and the first area and the first peripherally-extending edge may be sized larger than the second area and the second peripherally-extending edge. The entire extent of the local second plies may be disposed on or in the first extent of the first plurality of plies. The first plurality of plies may include a first property, the at least one second ply may include a second property, and the first property is different from the second property. In other embodiments, the at least one second ply may include one or more different second properties, which are different from the first property. The different properties are described below.

With regard to FIGS. 2-4, the second ply or plurality of plies may be elongated strips that are formed around corners or radii such as along a leading or trailing edge of a turbine blade or vane. In some embodiments, use of a single second ply may be disposed on a surface of the CMC article or in the CMC article. In some embodiments, use of a plurality of second plies may be regularly disposed or alternating with the first plurality of plies in the CMC article. Where a plurality of second plies are used, the plurality of second plies may be aligned or disposed side-by-side, for example, through a thickness of the CMC article.

Figure 5:
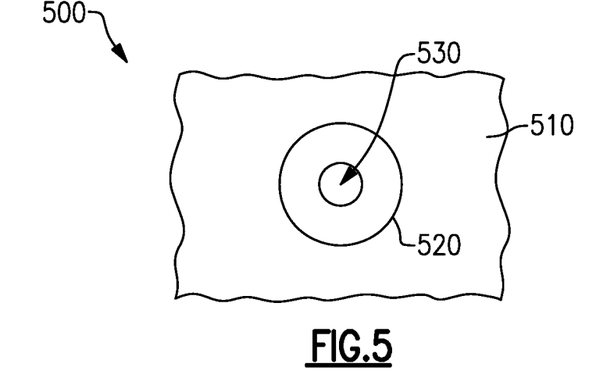
FIG. 5 is a top view of a CMC article according to an embodiment of the present disclosure.

FIG. 5 illustrates a plan view of a portion of a CMC article 500 having different localized properties in ceramic matrix composite article 500 according to an embodiment of the present disclosure. CMC article 500 may be formed from at least one or a plurality of first plies 510 (one of which shown in FIG. 5) of ceramic fibers in a ceramic matrix (not shown in FIG. 5) defining a first extent, and at least one or a plurality of local second plies 520 (one of which shown in FIG. 5) of ceramic fibers in the ceramic matrix defining a second extent in first plurality of plies 510. The second extent such as an area being less than the first extent such as an area. For example, the first plurality of plies may have a first extent having a first area defined by a first peripherally-extending edge, the local second plies may have a second extent having a second area defined by a second peripherally-extending edge, and the first area and the first peripherally-extending edge may be sized larger than the second area and the second peripherally-extending edge. The entire extent of the local second plies may be disposed on or in the first extent of the first plurality of plies. The first plurality of plies may include a first property, the at least one second ply includes a second property, and the first property is different from the said second property. In this illustrated example, at least one or a plurality of local second plies 520 may be one or more circular shaped plies and located in the CMC article for reinforcing an aperture 530 such as a hole. Suitable different properties are described below.

Figure 6:
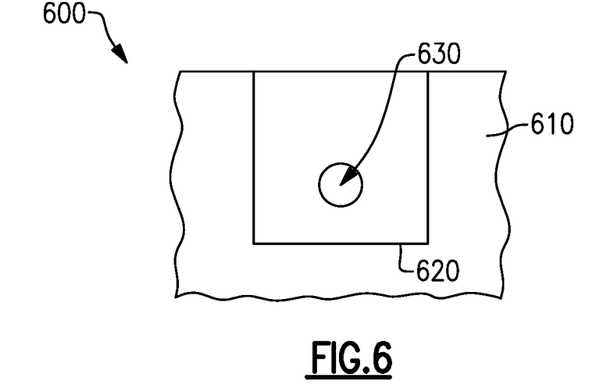
FIG. 6 is a top view of a CMC article according to an embodiment of the present disclosure.

FIG. 6 illustrates a plan view of a portion of a CMC article 600 having different localized properties in CMC article 600 according to an embodiment of the present disclosure. CMC article 600 may be formed from at least one or a plurality of first plies 610 (one of which shown in FIG. 6) of ceramic fibers in a ceramic matrix (not shown in FIG. 6) defining a first extent, and at least one or a plurality of local second plies 620 (one of which is shown in FIG. 6) of ceramic fibers in the ceramic matrix defining a second extent in first plurality of plies 610. The second extent such as an area being less than the first extent such as an area. For example, the first plurality of plies may have a first extent having a first area defined by a first peripherally-extending edge, the local second plies may have a second extent having a second area defined by a second peripherally-extending edge, and the first area and the first peripherally-extending edge may be sized larger than the second area and the second peripherally-extending edge. The entire extent of the local second plies may be disposed on or in the first extent of the first plurality of plies. The first plurality of plies may include a first property, the at least one second ply includes a second property, and the first property is different from the said second property. In this illustrated example, at least one or a plurality of local second plies 620 may be one or more square shaped plies and located in the CMC article for reinforcing an aperture 630 such as a hole. Suitable different properties are described below.

Figure 7:
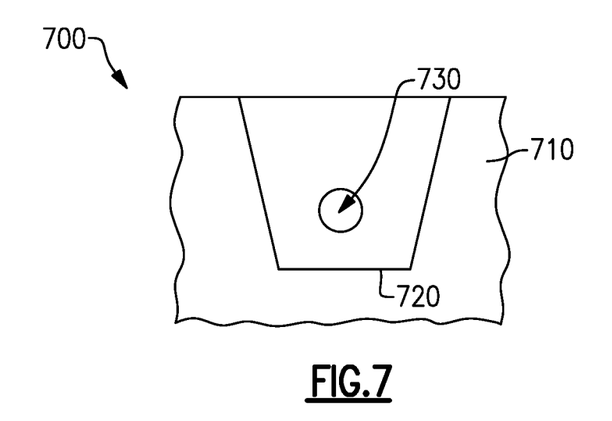
FIG. 7 is a top view of a CMC article according to an embodiment of the present disclosure.

FIG. 7 illustrates a plan view of a portion of a CMC article 700 having different localized properties in CMC article 700 according to an embodiment of the present disclosure. CMC article 700 may be formed from at least one or a plurality of first plies 710 (one of which is shown in FIG. 7) of ceramic fibers in a ceramic matrix (not shown in FIG. 7) defining a first extent, and at least one or a plurality of local second plies 720 (one of which is shown in FIG. 7) of ceramic fibers in the ceramic matrix defining a second extent in first plurality of plies 710. The second extent such as an area being less than the first extent such as an area. For example, the first plurality of plies may have a first extent having a first area defined by a first peripherally-extending edge, the local second plies may have a second extent having a second area defined by a second peripherally-extending edge, and the first area and the first peripherally-extending edge may be sized larger than the second area and the second peripherally-extending edge. The entire extent of the local second plies may be disposed on or in the first extent of the first plurality of plies. The first plurality of plies may include a first property, the at least one second ply includes a second property, and the first property is different from the said second property. In this illustrated example, at least one or a plurality of local second plies 720 may be one or more rectangular or trapezoidal shaped plies and located in the CMC article for reinforcing an aperture 730 such as a hole. Suitable different properties are described below.

With reference to FIGS. 5-7, the second ply may be one or more localized second plies, and may be disposed on and/or in the CMC articles as described in connection with FIGS. 2-4. In addition, the second ply or plurality of plies may be round, rectangular, or any other shape. The second ply or plurality of plies may be in contact with an edge of the CMC article or isolated from the edge of the CMC article. The second ply or plurality of plies may be located on an exterior of the CMC article or intermixed with the ply stackup of the CMC article. The second ply or plurality of plies may have a ply direction (or directions) that is the same as the rest of the CMC article or different from the rest of the CMC article.

Figure 8:
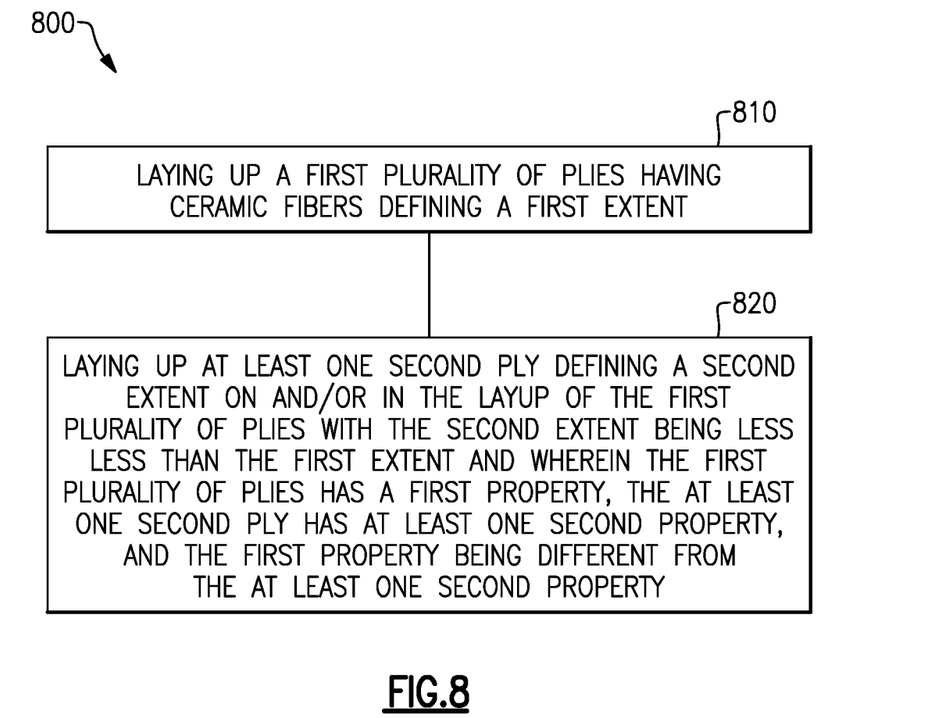
FIG. 8 is a flowchart of a method for use in forming a CMC article according to an embodiment of the present disclosure.

FIG. 8 illustrates a method 800 for use in forming a CMC article such as the CMC articles disclosed above according to an embodiment of the present disclosure. For example, method 800 may include at 810 laying up a first plurality of plies having ceramic fibers defining a first extent, at 820 laying up at least one second ply defining a second extent on and/or in the layup of the first plurality of plies with the second extent being less than the first extent and wherein the first plurality of plies has a first property, the at least one second ply has at least one second property, and the first property being different from the at least one second property.

Figure 9:
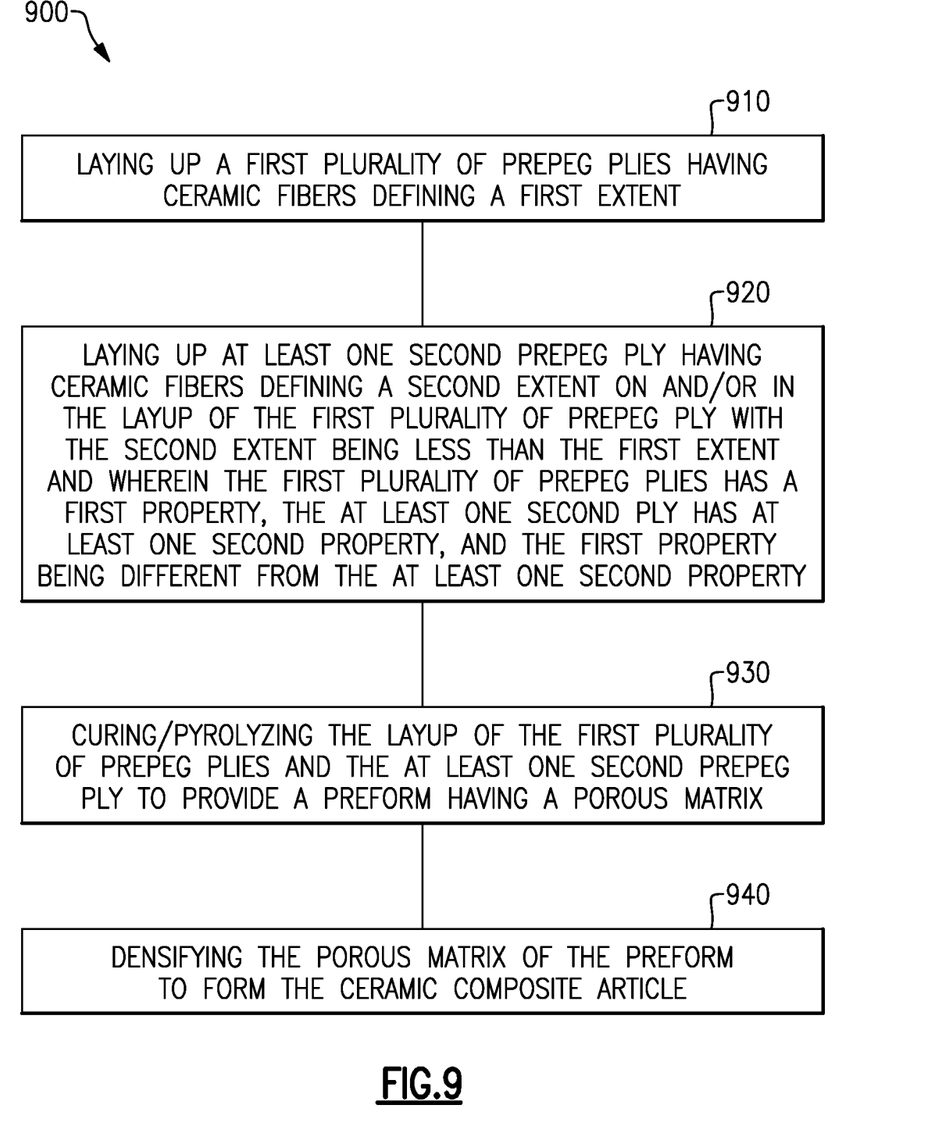
FIG. 9 is a flowchart of a method for forming a CMC article according to an embodiment of the present disclosure.

FIG. 9 illustrates a method 900 for use in forming a CMC article such as the CMC articles disclosed above according to an embodiment of the present disclosure. For example, method 900 may include at 910 laying up a first plurality of prepreg plies having ceramic fibers defining a first extent, at 920 laying up at least one second prepreg ply having ceramic fibers defining second extent on and/or in the layup of the first plurality of prepreg plies with the second extent being less than the first extent and wherein the first plurality of prepreg plies has a first property, the at least one second ply has a second property, and the first property being different from the second property, at 930 curing/pyrolyzing the layup of the first plurality of prepreg plies and the at least one second prepreg plies to provide a preform having a porous matrix, and at 940 densifying the porous matrix of the preform to form the ceramic composite article.

In connection with the above embodiment, the different portions, areas, or regions of the CMC article may have different properties such as mechanical (stress/strain) properties, thermal conductivity properties, electrical conductivity properties, etc.

For example, GE HiPerComp® CMC uses a SiC fiber in a matrix that contains both SiC and Si. The fibers are coated with BN based coatings. The boron nitride (BN) based coatings have lower moduli than either the SiC fiber or the Si—SiC matrix. If the coating thickness is kept about constant, then an increase in fiber volume fraction will cause a corresponding increase in coating volume fraction. As a result, such a CMC system displays the unusual behavior where an increase in fiber volume fraction produces a decrease in composite modulus. For composites made with an equal number of plies oriented in the 0 and 90 directions, the composite modulus has been observed to increase from about 220 MPa at a fiber volume fraction of about 34% to about 290 MPa at a fiber volume fraction of about 22%. When the fiber volume fraction is reduced to 0%, the resulting matrix only ply has a modulus of about 360 MPa. By locally varying the fiber volume fraction, the local modulus of the composite can be varied and the stiffness and mechanical response of the overall composite structure can be tailored.

The BN based coatings are also more insulating than the SiC fiber or the Si—SiC matrix. Therefore, by changing the volume fraction of fibers/coating, the thermal conductivity of the CMC can be changed. For the case of a CMC structure that experiences a thermal gradient, locally changing the coated fiber volume fraction can change the thermal gradient and stresses in the CMC structure.

The Coefficient of Thermal Expansion, CTE, of GE HiPerComp® CMC has also been observed to vary with fiber volume fraction, ranging from about 4.88-4.91 ppm/C at about 33% fiber to about 4.95-4.99 ppm/C at about 21% fiber to about 5.14 ppm/C at 0% fiber. For a CMC structure that experiences a thermal gradient, the local fiber volume fraction can be varied in order to vary the local CTE in order to control the local thermal stresses. Locally varying the composite CTE can also introduce favorable residual stresses in the composite structure.

For GE HiPerComp® CMC, the Proportional Limit, PL, of unidirectional composites with all of the fibers oriented in the 0 direction has been observed to increase from about 330 to about 610 MPa as the fiber volume fraction increased from about 21% to about 33%. Additionally, the PL of unidirectional 0 ply CMC has been observed to be as much as 2 to 3 times greater than that of balanced architecture 0/90 structures. In the case of a CMC structure that will experience a localized stress, by locally placing unidirectional prepreg material in the region of local stress and by aligning the fibers with the local stress, the local PL of the structure can be increased. The increase can be a function of local composite architecture as well as of local fiber volume fraction.

The creep properties of GE HiPerComp® CMC have been shown to improve with increasing fiber volume fraction. Therefore the creep properties of a CMC structure can be locally tailored by locally changing the fiber volume fraction.

In these examples, the properties of GE HiPerComp® CMC may be locally tailored by locally varying the volume fraction of coated fiber. The CMC properties can also be varied by changing the ratio or structure of other constituents, such as the free silicon content, pore content, coating thickness, coating properties, and fiber spacing. Different fibers can also be locally incorporated into the structure. In some instances, locally varying one or more of these factors can improve the manufacturability of the CMC. In some instances, varying one or more of these factors can alter the residual stress state of the CMC. Additionally, other constituents can be added to this CMC to locally vary the properties. For example, oxide or non-oxide materials maybe incorporated locally in order to achieve the desired thermal, mechanical, and electrical properties, or to obtain the desired response to environmental factors such as oxidation.

The present disclosure is not limited to the GE HiPerComp® CMC and it will be appreciated that the present disclosure can be applied to other CMC systems.

In some embodiments, the first property may include a first fiber volume fraction, the second property may include a second fiber volume fraction, and the first fiber volume fraction being different from the second first fiber volume fraction. For example, the first volume fraction may be about 15 percent to about 30 percent, and the second volume fraction of fiber may be about 30 percent to about 40 percent.

Figure 10:
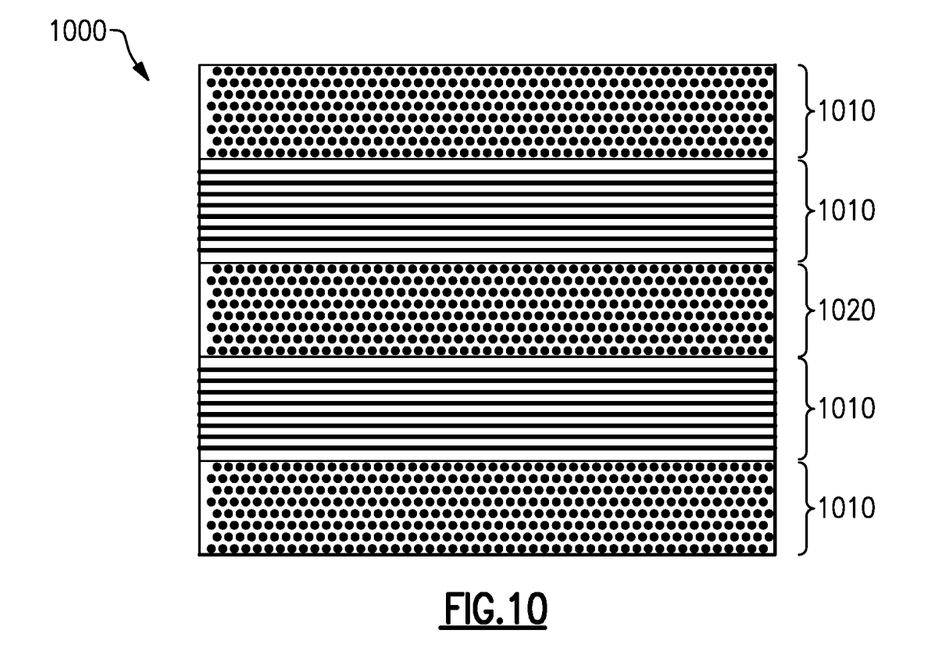
FIG. 10 is a cross-sectional view of a layup (prior to curing/pyrolyzing) of a plurality of unidirectional prepreg tapes for use in the forming of a CMC article according to an embodiment of the present disclosure.
Figure 11:
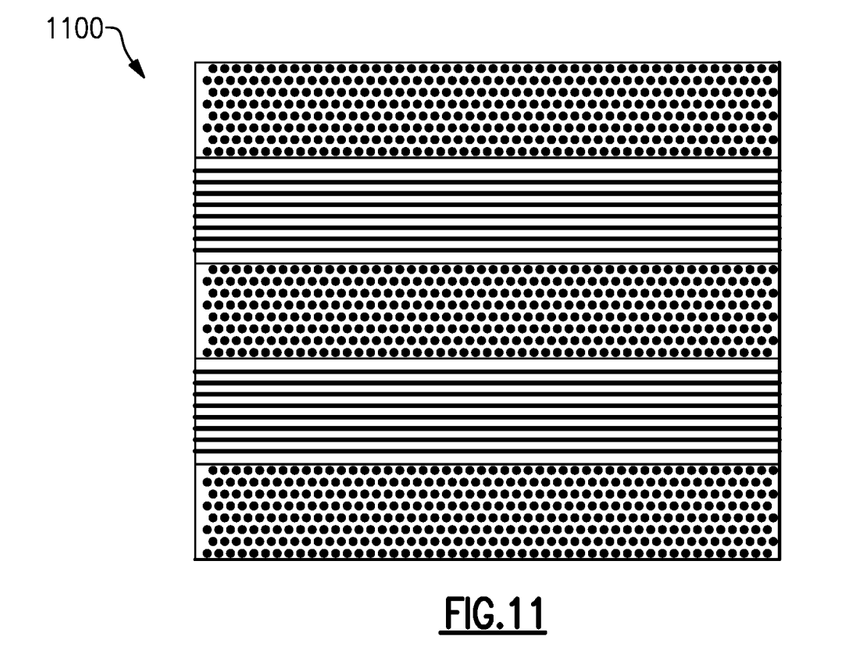
FIG. 11 is a cross-sectional view of a CMC article formed from the layup of FIG. 10, e.g., having undergone curing/pyrolyzing and densification.

With reference to FIGS. 10 and 11, the embodiments of the above described CMC articles may be formed initially as a shaped preform shown in FIG. 10, and then cured/pyrolyzed and densified as shown in FIG. 11.

Initially, with reference to FIG. 10, a layup 1000 may be fabricated from a first plurality of prepreg layers or plies 1010 having a first property in the form of tape-like structures of unidirectionally-aligned tows of ceramic fibers impregnated with a slurry and at least one second ply or plurality of second plies 1020 having a second property in the form of tape-like structures of unidirectionally-aligned tows of ceramic fibers impregnated with a slurry to create a generally two-dimensional laminate.

The first plurality of prepreg layers or plies 1010 and the localized at least one second prepreg layer or plies 1020 may include different properties such as different properties prior to curing/pyrolyzing and/or densification, or after curing or densification.

The prepreg may be formed from, for example, a reinforcement material of a desired CMC and a slurry, which slurry may include a matrix precursor, pore formers, binders, particulate fillers, and a carrier. The slurry can be infiltrated into coated tows by passing the tows through a bath of the slurry. The tow can then be wound onto a drum and may include partial drying of the slurry such that a tape is formed. The tape can be removed from the drum and unidirectional prepreg plies can be cut to from the tape.

Materials for the tows may include silicon carbide (SiC) fibers, polycrystalline SiC fibers, or other suitable fiber. An example of a material suitable for the tows is Hi Nicalon Type S from NGS Advanced Fibers Co. LTD. A suitable range for the diameters of the fibers is about five to about twenty micrometers, though fibers with larger and smaller diameters are also within the scope of this disclosure. The fibers may be preferably coated with materials such as a carbon or boron nitride interface layer (not shown) to impart certain desired properties to the CMC article, e.g., allows slippage between coating and the formed matrix material of the CMC article. A fiber tow, for example, may be a single bundle of about 500 individual fibers.

The slurry may include a matrix precursor such as organic or inorganic material that leaves char/residue after burnout such as pyrolysis or firing. In some embodiments, the matrix precursor may include a silicon containing precursor operable, as described below, for forming a porous silicon containing precursor such as silicon carbide in the cured preform. Examples of a matrix precursor include tetraethyl orthosilicate (TEOS), polycarbosilanes, polysilazanes, polysiloxanes, phenolics, and furanic compounds. A pore former may include a particle or other species that can remain present through a consolidation process but can be fugitive in the burnout or pyrolysis process resulting in a pore. Examples of a pore former can include polyvinyl butyral, polyethylene, polypropylene, polyamide, nylon, polytetrafluoroethylene (PTFE), polystyrene, polyvinyl acetate, polyvinyl alcohol, and/or cellulosic powders. Fillers may include an oxide or non-oxide particle or whisker that helps control shrinkage. Examples of a filler include SiC, C, $B_4C$, $SiO_2$, HfC, $HfB_2$, ZrC, $ZrB_2$, $MoSi_2$, $Si_3N_4$, $Al_2O_3$, rare earth silicates, and rare earth silicides. A carrier may include organic or inorganic liquid that dissolves or carries the matrix precursor and other ingredients. Examples of a carrier include water, isopropanol, toluene, and acetone.

The plurality of plies of the resulting prepregs are laid-up or stacked into a desired pattern and shape, and typically arranged so that tows of the prepreg layers are oriented parallel, transverse (e.g., perpendicular), or at an angle relative to other tows of the prepreg layers in other plies. The plurality of plies may typically undergo consolidation or debulking while subjected to applied pressure and an elevated temperature, such as in a vacuum bag or in an autoclave or localized application of pressure and heat.

The consolidated plurality of stacked plies may be subjected to burnout such as pyrolysis or heated in vacuum or in an inert or a reactive atmosphere in order to decompose the matrix precursor, to form a ceramic or ceramic char, and where the pore former is, for example, volatilized, and produces a porous preform, which porous preform is densified, resulting in a CMC article 1100 illustrated in FIG. 11.

While a layup of first and second plies may be cured/pyrolyzed at the same time, it will be appreciated that a CMC article according to the present disclosure may include a first layup of the first plurality of plies, which first layup is cured/pyrolyzed, and then layup of the local at least one second ply on the cured/pyrolyzed first plies. In still other embodiments, a CMC article according to the present disclosure may include a first layup of the first plurality of plies, which first layup is cured/pyrolyzed and densified, and then layup of the at least one local second ply on the densified first plies.

The cured preform may be subject to chemical vapor infiltration, such as with a gaseous source of silicon carbide supplied externally. The gaseous silicon carbide source infiltrates into the porosity, reacts to deposit SiC on the internal pore surfaces of the porous layer to form a densified silicon carbide matrix of the CMC article. An appropriate chemical vapor infiltration gas may include methyl-trichlorosilane, dimethyl-dichlorosilane, silane+methane, tetrachlorosilane+methane, and other suitable gases. In other embodiments, densification may include a melt infiltration process to form a finished CMC article. The melt infiltration may include silicon, silicon alloy, a silicide, an oxide, or a combination thereof. In other embodiments, a combination of chemical vapor infiltration and melt infiltration may be employed. In other embodiments, densification may include a slurry cast process.

Those skilled in the art will appreciate that the teachings of this disclosure are also applicable to other CMC material combinations, and that such combinations are within the scope of this disclosure. Suitable materials for use in the chemical vapor infiltration process may include silicon carbide, silicon nitride, silicon oxy-nitride, silicon oxy-carbide, silicon dioxide, aluminum nitride, aluminum oxide, boron carbide, zirconium carbide, hafnium carbide, zirconium diboride, hafnium diboride, molybdenum silicides, and other suitable material.

In the chemical vapor infiltration (CVI) process, a matrix material such as silicon carbide is infiltrated into a fibrous preform by the use of reactive gases at elevated temperature. Generally, limitations introduced by having reactants diffuse into the preform and by-product gases diffusing out of the preform result in relatively high residual porosity of between about 12 percent and about 15 percent in the composite. In the forming of the CMCs using CVI, the inner portion of the composite formed by CVI typically has a higher porosity than the porosity of the outer portion. The CVI composite matrices typically have no free silicon phase, good creep resistance and the potential to operate at temperatures above 2,570 degrees Fahrenheit.

Melt infiltration may result in CMC articles that are fully dense, e.g., having generally zero, or less than about 5 or less that about 3 percent by volume residual porosity. This very low porosity gives the composite desirable mechanical properties, such as a high proportional limit strength and interlaminar tensile and shear strengths, high thermal conductivity and good oxidation resistance. The matrices may have a free silicon phase (i.e. elemental silicon or silicon alloy) that may limit the use temperature of the ceramic matrix composite articles to below that of the melting point of the silicon or silicon alloy, or about 2,550 degrees Fahrenheit to 2,570 degrees Fahrenheit. The free silicon phase may result in a lower creep resistance compared to densification solely by chemical vapor infiltration.

In other embodiments, it will be appreciated that unidirectional plies, woven plies, other types of plies, and combinations thereof may be suitably employed in connection with the embodiments or the present disclosure.

From the present description, it will be appreciated that the CMC articles of the present disclosure have different localized properties. Application of materials with different properties may allow tailoring the CMC article to have one or more localized portions, areas, or regions in the CMC article with different properties such as different mechanical (stress/strain) properties, different thermal conductivity properties, different electrical conductivity properties, etc., and combinations thereof.

Such a CMC articles may be advantageous for application to silicon-bearing ceramic turbine components, for example, turbine blades, vanes, nozzles, shrouds, combustors, etc., and repairs thereof.

It is to be understood that the above description is intended to be illustrative, and not restrictive. Numerous changes and modifications may be made herein by one of ordinary skill in the art without departing from the general spirit and scope of the disclosure as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably" in conjunction with terms such as coupled, connected, joined, sealed or the like is used herein to refer to both connections resulting from separate, distinct components being directly or indirectly coupled and components being integrally formed (i.e., one-piece, integral or monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

This written description uses examples, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A ceramic matrix composite article comprising:
a first plurality of plies of ceramic fibers in a first ceramic matrix defining a first area, the first plurality of plies comprising a first material; and
a second ply comprising a second ceramic matrix and defining a second area, wherein said second ply is situated within one ply from said first plurality of plies such that the second ply and the one ply from said first plurality of plies are situated extending longitudinally in a same plane, the second ply comprising a second material, said second area comprising at least one aperture, said second area being less than said first area,
wherein said first material is different from that of said second material,
wherein a fiber volume fraction of the first plurality of plies is different from a fiber volume fraction of the second ply and a stress/strain mechanical property of said first plurality of plies is different from a stress/strain mechanical property of said second ply, with the fiber volume fractions and the respective stress/strain mechanical properties being inversely related,
wherein the stress/strain mechanical property is modulus, and
wherein the ceramic fibers of the fiber volume fraction of the first plurality of plies comprise a coating of a lower moduli than that of the ceramic fibers or that of the first ceramic matrix.

2. The ceramic matrix composite article of claim 1, wherein said second ply comprises fibers with the coating.

3. The ceramic matrix composite article of claim 1, wherein said second ply is a plurality of second plies.

4. The ceramic matrix composite article of claim 1, wherein said first ceramic matrix and said second ceramic matrix are the same.

5. The ceramic matrix composite article of claim 1, wherein said first ceramic matrix is different from said second ceramic matrix.

6. The ceramic matrix composite article of claim 1, wherein said fiber volume fraction of the first plurality of plies is a first fiber volume fraction, said fiber volume fraction of the second ply is a second fiber volume fraction, and said first fiber volume fraction is less than said second fiber volume fraction.

7. The ceramic matrix composite article of claim 6, wherein said first fiber volume fraction is about 15 percent to about 30 percent and said second fiber volume fraction is about 30 percent to about 40 percent.

8. The ceramic matrix composite article of claim 1, wherein said second ply is a circular second ply, a square second ply, or a rectangular second ply.

9. The ceramic matrix composite article of claim 2, wherein said fiber volume fraction of the first plurality of plies is a first fiber volume fraction, said fiber volume fraction of the second ply is a second fiber volume fraction, and said first fiber volume fraction is greater than said second fiber volume fraction.

10. The ceramic matrix composite article of claim 3, wherein said at least one aperture in the ceramic matrix composite article is a plurality of apertures.

11. The ceramic matrix composite article of claim 1, wherein said second ply has a thermal conductivity property different from that of said first plurality of plies.

12. The ceramic matrix composite article of claim 1, wherein said second ply is a plurality of second plies disposed in said first plurality of plies.

13. The ceramic matrix composite article of claim 3, wherein the plurality of second plies is interspersed.

14. The ceramic matrix composite article of claim 2, wherein said ceramic fibers of said second ply comprise silicon carbide fibers and said second ceramic matrix comprises silicon carbide.

15. The ceramic matrix composite article of claim 2, wherein said ceramic matrix composite article comprises a turbine component.

16. The ceramic matrix composite article of claim 2, wherein said ceramic matrix composite article comprises a turbine component repair.

17. The ceramic matrix composite article of claim 2, wherein the ceramic fibers in the first plurality of plies and the ceramic fibers in the second ply are unidirectional.

* * * * *